US010656373B1

(12) United States Patent
Bardagjy

(10) Patent No.: US 10,656,373 B1
(45) Date of Patent: May 19, 2020

(54) APPARATUSES, SYSTEMS, AND METHODS FOR A MULTISTABLE LENS ACTUATOR PROVIDING MULTIPLE STABILIZED DISCRETE POSITIONS

(71) Applicant: FACEBOOK TECHNOLOGIES, LLC, Menlo Park, CA (US)

(72) Inventor: Andrew Matthew Bardagjy, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 168 days.

(21) Appl. No.: 15/791,201

(22) Filed: Nov. 1, 2017

(51) Int. Cl.
  *G02B 27/64* (2006.01)
  *G02B 7/08* (2006.01)
  *G02B 26/12* (2006.01)

(52) U.S. Cl.
  CPC .............. *G02B 7/08* (2013.01); *G02B 26/128* (2013.01); *G02B 27/64* (2013.01); *G02B 27/646* (2013.01)

(58) Field of Classification Search
  CPC .... G02B 27/64; G02B 27/646; G02B 7/0003; G02B 7/02; G02B 7/021; G02B 7/022; G02B 7/023; G02B 7/028; G02B 7/04; G02B 7/09; G02B 15/00; G02B 15/14; H04N 5/23248; H04N 5/23264; H04N 5/2328; H04N 5/23287

USPC ....... 359/554, 557, 811, 819, 820, 821, 822, 359/823, 824, 826, 676, 694, 703, 704, 359/705; 250/201.1, 201.2, 201.4
  See application file for complete search history.

(56) References Cited

U.S. PATENT DOCUMENTS

| | | | | |
|---|---|---|---|---|
| 7,440,201 | B2 * | 10/2008 | Tsuruta | H04N 5/2254 348/E5.028 |
| 8,073,320 | B2 | 12/2011 | Topliss et al. | |
| 9,127,652 | B2 | 9/2015 | Kato et al. | |
| 10,222,577 | B2 * | 3/2019 | Murakami | G02B 7/02 |
| 2017/0227731 | A1 | 8/2017 | Eromaki | |
| 2018/0239217 | A1 * | 8/2018 | Konuma | G02B 7/04 |
| 2019/0196135 | A1 * | 6/2019 | Park | G02B 7/08 |

* cited by examiner

*Primary Examiner* — Arnel C Lavarias
(74) *Attorney, Agent, or Firm* — FisherBroyles, LLP

(57) ABSTRACT

The disclosed apparatus may include (1) a camera lens assembly including at least one lens held within a lens barrel, (2) a conductive coil fixably attached to the lens barrel, (3) a housing at least partially surrounding the conductive coil and the lens barrel, (4) at least one mechanical flexure maintaining the lens barrel within the housing and allowing movement of the lens barrel between stabilized discrete positions along an optical axis of the lens barrel, and (5) a magnet spaced from the conductive coil and coupled to the housing such that, in response to an electrical current in the conductive coil, an electromagnetic interaction between the conductive coil and the magnet causes the lens barrel to move from a first position of the stabilized discrete positions to a second position of the stabilized discrete positions. Various other systems and methods are also disclosed.

18 Claims, 13 Drawing Sheets

APPARATUSES, SYSTEMS, AND METHODS FOR A MULTISTABLE LENS ACTUATOR PROVIDING MULTIPLE STABILIZED DISCRETE POSITIONS

BACKGROUND

High-sensitivity imaging systems are often employed in computer vision systems to detect subtle differences in image features, particularly under low-light conditions. Such imaging systems are typically desirable when used with active illumination, such as structured light (e.g., a known light pattern of bars, grids, or the like), unstructured light, modulated light for time-of-flight (TOF) systems, and so forth. To accomplish this sensitivity, the lens aperture for the imaging system is typically increased, which limits the depth of field (DOF) of the imaging system at many lens positions.

In such systems, a variable focus actuator that moves the lens along its optical axis, closer to or further away from the aperture, is often employed to expand the overall working range of the imaging system. However, in many computer vision applications, the intrinsic characteristics of the imaging system change as the position of the lens changes. Examples of these intrinsic characteristics include focal length (the distance over which collimated light rays passing through the lens are brought to focus), optical center (the point of intersection of the optical axis at the image sensor), and lens distortion (radial and/or tangential distortion of an image captured using the lens). Consequently, for each of a virtually infinite number of lens positions available, ranging from a macro focus position to an infinity focus position, a corresponding set of intrinsic characteristics are typically applied to the captured image based on an accurate determination of the current location of the lens. Additionally, each of the intrinsic characteristics may be further influenced by the current temperature of imaging system. As a result, as the variable focus actuator moves the lens from one position to another, the position of the lens is typically determined (possibly along with the current temperature), and various intrinsic characteristics for the new lens position are applied. Those characteristics may have been previously stored for the new lens position, or may be interpolated based on stored intrinsic characteristics for one or more nearby lens positions.

SUMMARY

As will be described in greater detail below, the instant disclosure describes apparatuses, systems, and methods for a multistable actuator. In one example, an apparatus for a multistable lens actuator may include (1) a camera lens assembly comprising at least one lens held within a lens barrel, (2) a conductive coil fixably attached to the lens barrel, (3) a housing at least partially surrounding the conductive coil and the lens barrel, (4) at least one mechanical flexure maintaining the lens barrel within the housing and allowing movement of the lens barrel between stabilized discrete positions along an optical axis of the lens barrel, and (5) a magnet spaced from the conductive coil and coupled to the housing such that, in response to an electrical current in the conductive coil, an electromagnetic interaction between the conductive coil and the magnet causes the lens barrel to move from a first position of the stabilized discrete positions to a second position of the stabilized discrete positions. In some examples, the lens barrel may stably remain at a present position of the stabilized discrete positions when the electrical current ceases. In some embodiments, the conductive coil may surround the lens barrel. Also in some examples, the apparatus may further include an adjustment component that determines the first position. In some embodiments, the first position may correspond to an infinity focus position for the lens barrel and the second position may correspond to a macro focus position for the lens barrel.

According to some embodiments, a maximum number of the stabilized discrete positions may be two. In some examples, the apparatus may further include (1) a first contact component connected to the housing, wherein the first contact component defines the first position when the lens barrel contacts the first contact component, and (2) a second contact component connected to the housing, wherein the second contact component defines the second position when the lens barrel contacts the second contact component. In some embodiments, the at least one mechanical flexure may bias the lens barrel against the first contact component at the first position to mechanically stabilize the lens barrel at the first position, and may bias the lens barrel against the second contact component at the second position to mechanically stabilize the lens barrel at the first position. In some examples, the first contact component may include a first contact magnet that magnetically stabilizes the lens barrel at the first position, and the second contact component may include a second contact magnet that magnetically stabilizes the lens barrel at the second position. Also, the apparatus may further include (1) a first metallic extension coupled to the lens barrel that contacts the first contact magnet when the lens barrel is at the first position, and (2) a second metallic extension coupled to the lens barrel that contacts the second contact magnet when the lens barrel is at the second position.

In some embodiments, the at least one mechanical flexure may include (1) a first mechanical flexure coupled to the lens barrel proximate a first end of the lens barrel, and (2) a second mechanical flexure coupled to the lens barrel proximate a second end of the lens barrel opposite the first end.

In some examples, a maximum number of the stabilized discrete positions may be greater than two. In some embodiments, the housing may define an inner surface facing the lens barrel, the lens barrel may define an outer surface facing the housing that stably engages the inner surface of the housing at each of the stabilized discrete positions, and the at least one mechanical flexure may bias the outer surface of the lens barrel against the inner surface of the housing. Also in some examples, the inner surface of the housing may include at least one protrusion, and the outer surface of the lens barrel may include a plurality of grooves that stably engage the at least one protrusion at each of the stabilized discrete positions. In some embodiments, each of the at least one mechanical flexure may include (1) a first end and a second end connected to the housing, and (2) a central portion between the first end and the second end that exerts a mechanical force against the outer surface of the lens barrel.

In some embodiments, the apparatus may further include at least one position sensor that indicates a current position of the stabilized discrete positions of the lens barrel.

In addition, a corresponding camera system may include (1) a camera lens assembly comprising at least one lens held within a lens barrel, (2) a conductive coil fixably attached to the lens barrel, (3) a housing at least partially surrounding the conductive coil and the lens barrel, (4) at least one mechanical flexure maintaining the lens barrel within the housing while allowing movement of the lens barrel between stabilized discrete positions along an optical axis of the lens barrel, (5) a magnet spaced from the conductive coil and coupled to the housing such that, in response to an electrical current in the conductive coil, an electromagnetic interaction between the conductive coil and the magnet causes the lens barrel to move from a first position of the stabilized discrete positions to a second position of the stabilized discrete positions, and (6) an image sensor mechanically coupled to the housing and optically coupled to the at least one lens to capture light passing through the at least one lens.

Additionally, a corresponding method for a multistable lens actuator may include (1) receiving, at a conductive coil fixably attached to a lens barrel, an electrical current, wherein the lens barrel is maintained within a housing by at least one mechanical flexure, and (2) moving, in response to the electrical current, the lens barrel from a first position of a plurality of stabilized discrete positions to a second position of the plurality of the stabilized discrete positions along an optical axis of the lens barrel based on an electromagnetic interaction between the conductive coil and a magnet spaced from the conductive coil and coupled to the housing.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
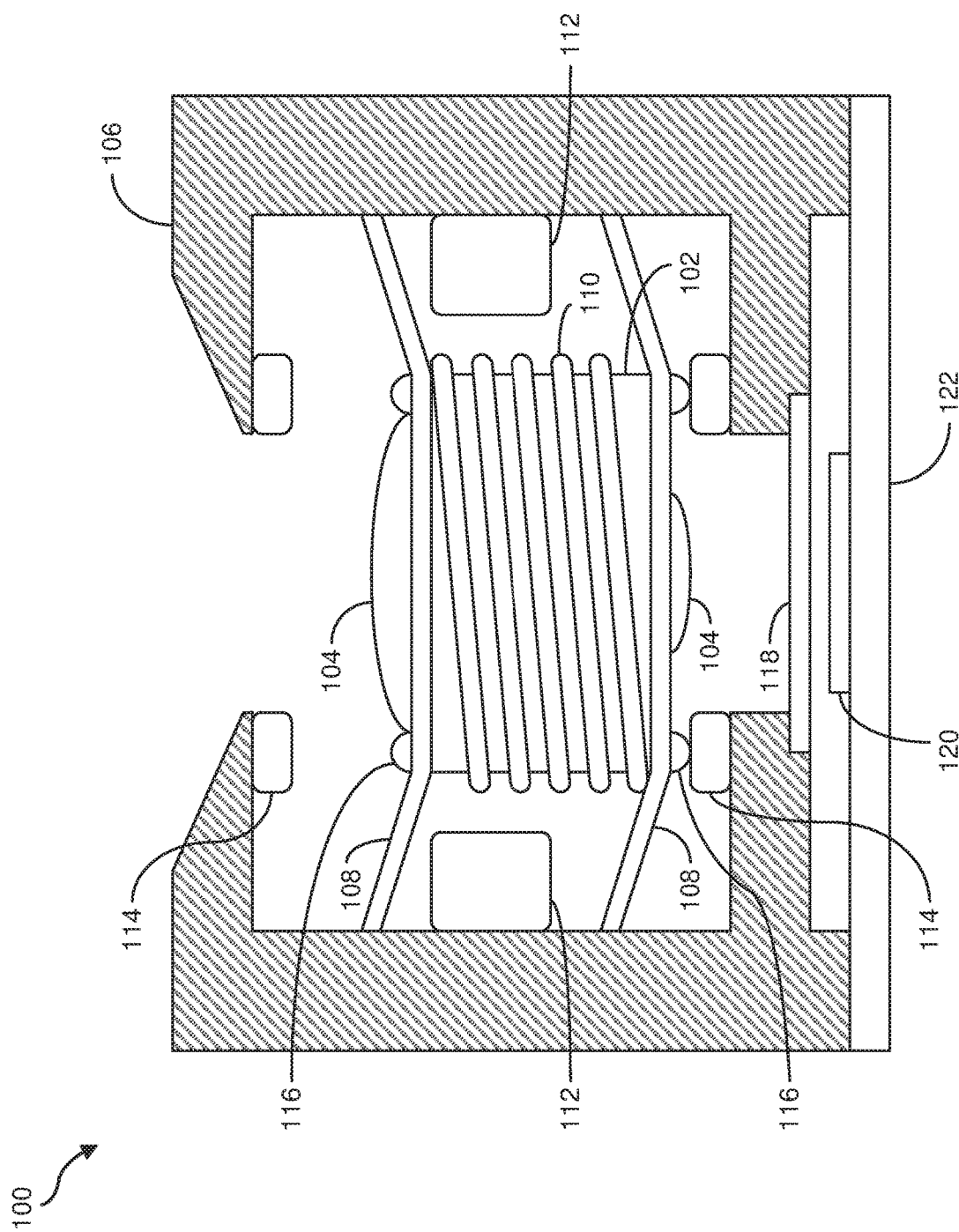
FIG. 1 is a side view of a first example apparatus for a bistable lens actuator in an infinity focus position.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for a multistable lens actuator. As will be explained in greater detail below, embodiments of the instant disclosure may provide a lens actuator with a discrete number (e.g., two or more) of known lens positions along the optical axis of the lens. Consequently, in some examples, intrinsic parameters of the imaging system may be determined for each known position, thus at least reducing a need for interpolating those parameters across a continuum of lens positions. Also, based on the discrete known lens positions, accurate lens position measurement normally associated with continuous variable focus actuators during operation may be unnecessary.

The following will provide, with reference to FIGS. 1-13, detailed descriptions of example apparatuses, systems, and methods for multistable lens actuators, as what may be used in conjunction with a camera or other imaging system. More specifically, with respect to FIGS. 1 and 2, detailed descriptions of first examples of a bistable (two-position) lens actuator are presented. Descriptions of second examples of a bistable lens actuator are provided in conjunction with FIGS. 3 and 4. Example embodiments of a multistable (two or more positions) lens actuator are described in connection with FIGS. 5 and 6. Descriptions regarding various example methods of calibrating and operating a multistable lens actuator are presented in relation to FIGS. 7-10. In conjunction with FIGS. 11-13, examples of a head-mounted display system including an example multistable lens actuator are discussed.

Figure 2:
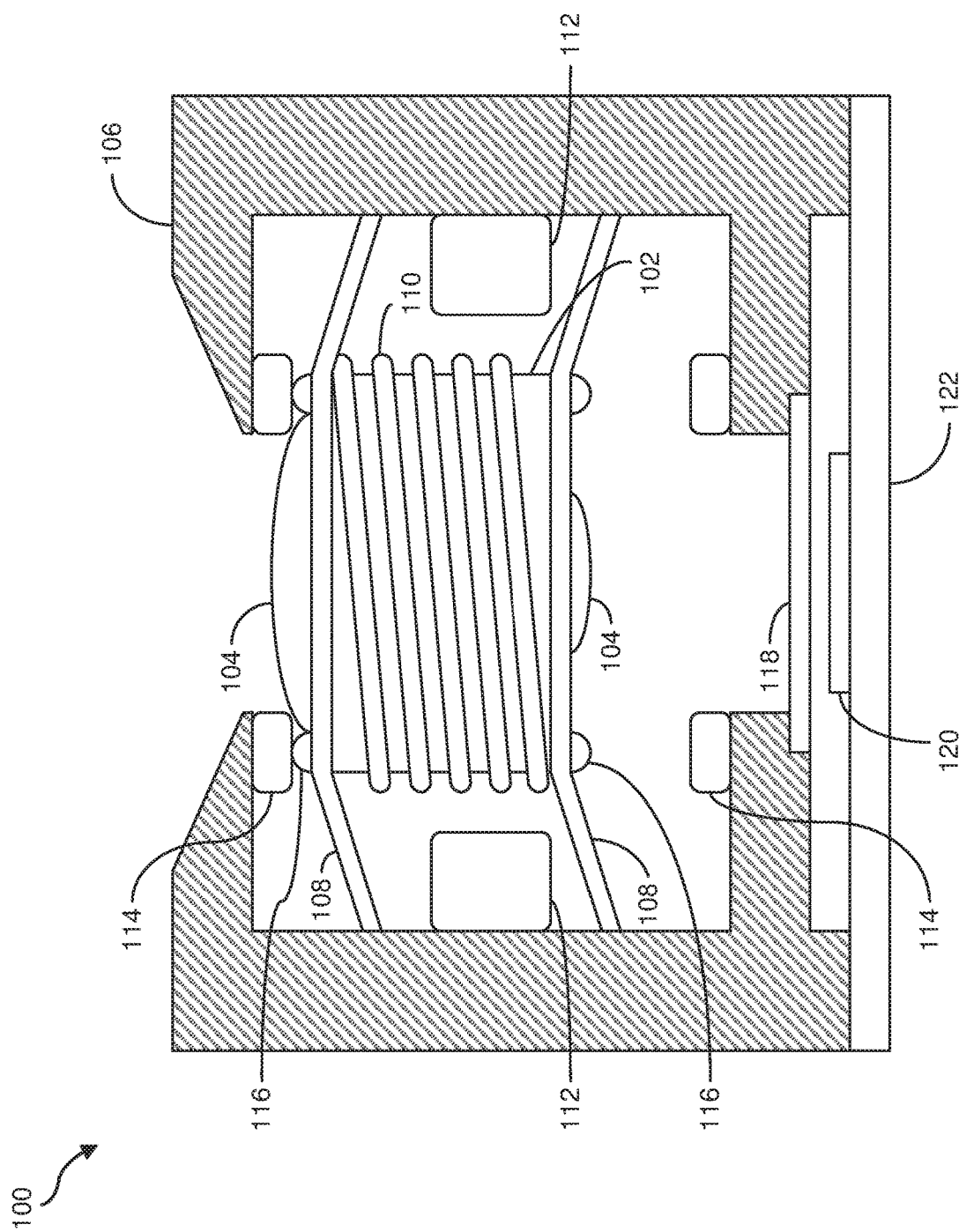
FIG. 2 is a side view of the first example apparatus of FIG. 1 for a bistable lens actuator in a macro focus position.

FIGS. 1 and 2 are side views of an example bistable lens actuator 100 in which actuator 100 may hold one or more lenses 104 in one of two stable positions along an optical axis of lens 104. In an example, the two stable positions may be an infinity focus position (e.g., as shown in FIG. 1) for focusing on objects relatively far from actuator 100, and a macro focus position (e.g., as depicted in FIG. 2) for focusing on objects relatively close to actuator 100. As illustrated in FIG. 1, lens 104 may be formed from glass, plastic, or another material, and may be maintained or held within a lens barrel 102 to form a camera lens assembly, although other types of physical structures, in conjunction with lens 104, may serve as a camera lens assembly in other embodiments. Len barrels 102 may include metal, plastic, and/or other materials.

At least one mechanical flexure 108 may maintain lens barrel 102 within a housing 106 that at least partially surrounds lens barrel 102. Housing 106 is shown in cross-section in the various drawings, and may include plastic, metal, and/or another material of suitable rigidity. In some examples, housing 106 may be part of a larger mechanical structure, such as a body of an imaging system or a larger device. In some embodiments, mechanical flexure 108 may be of a flexible, resilient nature, and may include two separate members: one coupled at a first end of lens barrel 102, and another coupled at a second end of lens barrels 102, each of which is also coupled to an interior of housing 106, as illustrated in FIGS. 1-4. Also in some examples, mechanical flexure 108 may restrict the movement of lens barrel 102 along the optical axis of lens 104.

As shown in FIG. 1, housing 106 may also be connected to a filter 118 for filtering light received through lens 104 before the light is captured at an image sensor 120. Also as depicted in FIG. 1, image sensor 120 may be attached to a circuit board 122 (e.g., a rigid printed circuit board (PCB), a flex PCB, or a ceramic PCB) or other medium that is connected to housing 106. Consequently, housing 106, directly or indirectly, may hold filter 118 and image sensor 120 stationary relative to the movement of lens barrel 102. In some examples, electronics for capturing, processing, and storing images using lens 104, as well as electronics for facilitating movement of lens barrel 102 and for performing other functions, may reside on printed circuit board 122.

To cause movement of lens barrel 102 within housing 106, a conductive coil 110 (e.g., made from copper or another conductive material) may be fixably attached to lens barrel 102, such as by being coiled about lens barrel 102, as illustrated in FIGS. 1-4. In some examples, conductive coil 110 may be attached to lens barrel 102 by way of an adhesive or other means. Also, one or more magnets 112 may be attached or coupled to housing 106 (e.g., to an interior surface of housing 106) and spaced from conductive coil 110. In such a configuration, bistable lens actuator 100, as well as other multistable lens actuators described herein, may operate in a manner similar to a voice coil actuator, whereby an electrical current flowing in the conductive coil may cause an electromagnetic interaction between conductive coil 110 and magnet 112. As a result of the electromagnetic interaction, conductive coil 110, as well as lens barrel 102 attached thereto, may experience a force causing conductive coil 110 and lens barrel 102 to move along the optical axis of lens 104, as enforced by mechanical flexure 108.

In some examples, an electrical current flowing in a first direction in conductive coil 110 causes conductive coil 110 and lens barrel 102 to move away from image sensor 120 (e.g., toward a macro focus position), and an electrical current flowing in a second, opposing direction in conductive coil 110 cause conductive coil 110 and lens barrel 102 to move toward image sensor 120 (e.g., toward an infinity focus position). In an embodiment, the electrical current in conductive coil 110 may be a current pulse, although other waveforms for the electrical current may be used in other examples.

As illustrated in FIG. 1, lens barrel 102 is in an infinity focus position, while in FIG. 2, lens barrel 102 is located in a macro focus position. In some examples of FIGS. 1 and 2, lens barrel 102 is held in a stable position or location, even while no electrical current is flowing conductive coil 110, and is thus not imparting an electromagnetic force on conductive coil 110. In some embodiments, lens barrel 102 and accompanying lens 104 are held in one of the two stable positions by way of one or more contact magnets 114 (e.g., attached or connected to housing 106) interacting with metallic contact pads 116 (e.g., ferrous balls or small magnets) or other metallic extensions (e.g., attached to opposing ends of lens barrel 102, or to opposing mechanical flexures 108). Consequently, when conductive coil 110 and lens barrel 102 travel toward the infinity focus position (e.g., toward image sensor 120), contact pads 116 at the lower end of lens barrel 102 come into contact with contact magnets 114 at the lower end of housing 106, thus magnetically stabilizing lens barrel 102 and associated lens 104 at the infinity focus position, as depicted in FIG. 1, by magnetic attraction between contact magnet 114 and contact pad 116 at the lower portion of housing 106.

Thereafter, in response to an opposing electrical current in conductive coil 110, the electromagnetic force operating on conductive coil 110 may overcome the magnetic attraction between contact magnet 114 and contact pad 116 at the lower portion of housing 106, propelling conductive coil 110 and lens barrel 102 upward toward the macro focus position. Upon reaching or approaching the macro focus position, a magnetic attraction between one or more contact magnets 114 connected to an upper portion of housing 106 and contact pads 116 connected to upper mechanical flexure 108 or an upper end of lens barrel 102 may magnetically stabilize lens barrel 102 and associated lens 104 against contact pads 116 in the macro focus position, as depicted in FIG. 2. Again, as described above, the stabilization of lens barrel 102 and lens 104 in the macro focus position may occur without any additional electrical current flowing in conductive coil 110. Also in some examples, contact magnets 114 and contact pads 116 at the upper and lower portions of housing 106 may be constructed and located such that lens barrel 102 and lens 104 may remain stationary only in the infinity focus position (FIG. 1) or the macro focus position (FIG. 2) if not transitioning between those two positions.

When lens barrel 102 is in the stabilized macro focus position of FIG. 2, another electrical current in conductive coil 110 imparting an electromagnetic force on conductive coil 110 and lens barrel 102 may overcome the magnetic attraction between upper contact magnets 114 and upper contact pads 116, allowing conductive coil 110 and lens barrel 102 to proceed towards the infinity macro focus location exhibited in FIG. 1.

In at least some examples of FIGS. 1 and 2, contact magnets 114 are connected to housing 106 and contact pads 116 are connected to mechanical flexure 108 and/or lens barrel 102. In yet other embodiments, contact magnets 114 may be connected to mechanical flexure 108 and/or lens barrel 102 while contact pads 116 are connected to housing 106. In yet other examples, contact magnets 114 and contact pads 116 may be magnets of opposing polarity to generate the magnetic attraction noted above.

Also in some embodiments, one or more mechanical flexures 108 may be electrically coupled to conductive coil 110 to carry the electrical current described above to and from conductive coil 110.

Figure 3:
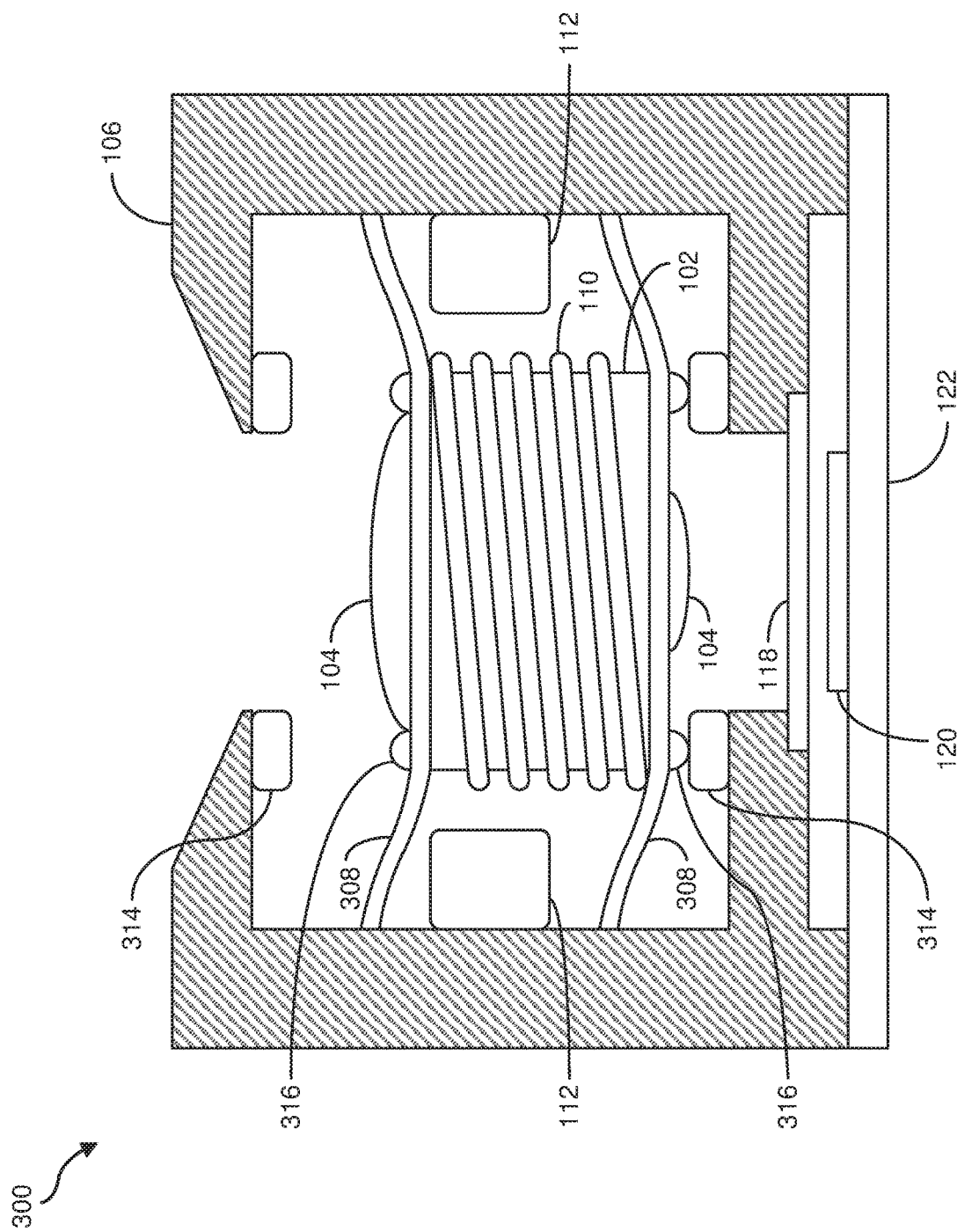
FIG. 3 is a side view of a second example apparatus for a bistable lens actuator in an infinity focus position.
Figure 4:
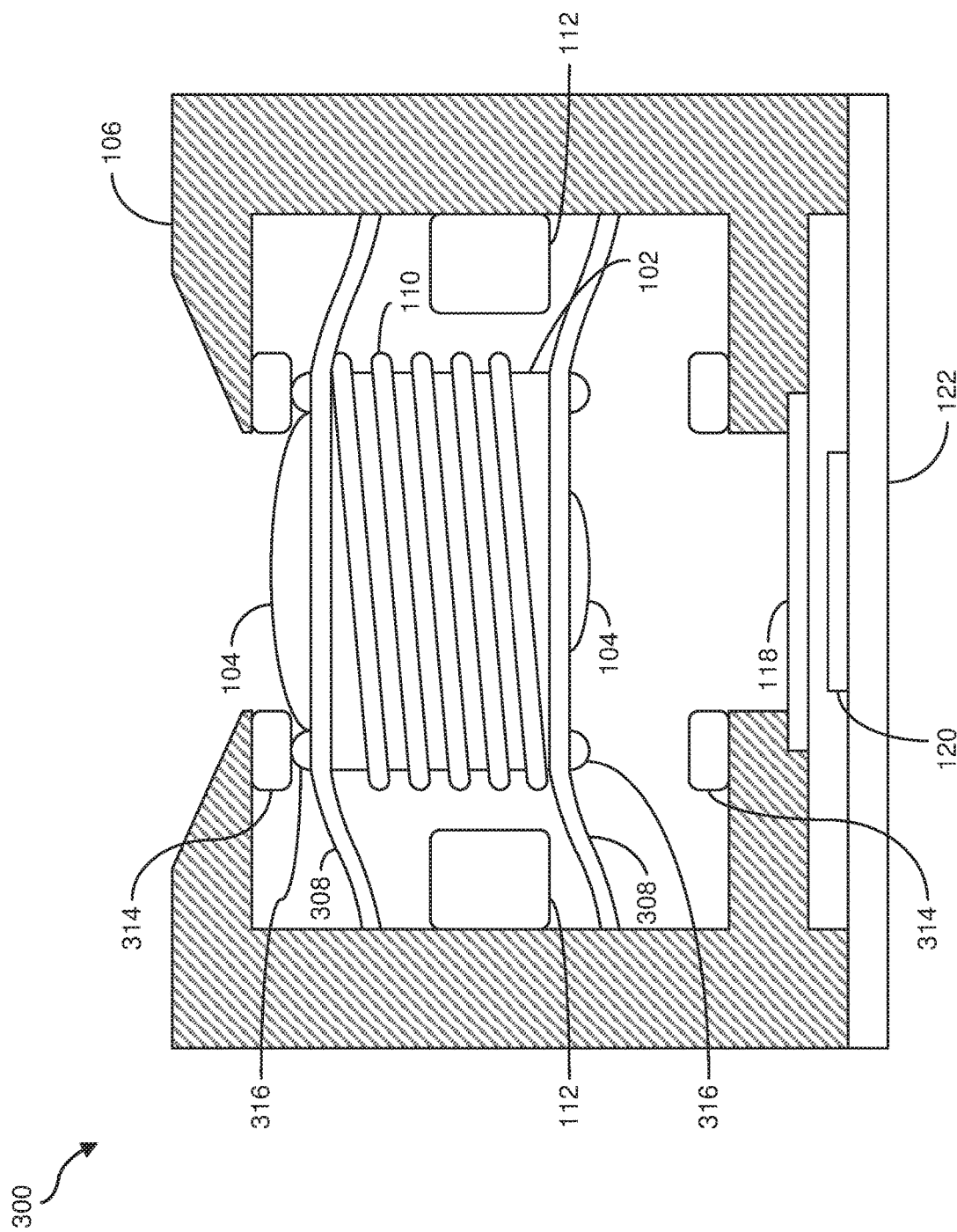
FIG. 4 is a side view of the second example apparatus of FIG. 3 for a bistable lens actuator in a macro focus position.

FIGS. 3 and 4 are side views of another example bistable lens actuator 300 in which actuator 300 may hold one or more lenses 104 in one of two stable positions (e.g., an infinity focus position shown in FIG. 3, and a macro focus position depicted in FIG. 4) along an optical axis of lens 104. Moreover, in FIGS. 3 and 4, lens barrel 102, lens 104, housing 106, conductive coil 110, magnet 112, filter 118, image sensor 120, and printed circuit board 122 are similar to, and perform similar functions as, those components as employed in FIGS. 1 and 2.

However, instead of employing contact magnets 114 and contact pads 116 to magnetically stabilize lens barrel 102 and corresponding lens 104 in each of the two discrete positions, the examples of FIGS. 3 and 4 may employ one or more mechanical flexures 308 that are structured to physically bias lens barrel 102 and lens 104 in the infinity focus position (FIG. 3) or the macro focus position (FIG. 4). In some embodiments, after being forced toward one of the focus positions by the electromagnetic interaction of conductive coil 110 and magnet 112 in response to an electrical current flowing in conductive coil 110, mechanical flexure 308 may structurally "collapse" in a manner that biases lens barrel 102 toward one of the two positions. In some examples, at least one contact component 316 (e.g., a sapphire ball) is connected to each of an upper or lower end of lens barrel 102, or to each mechanical flexure 308, and at least one contact pad 314 is connected or affixed to an upper and lower portion of housing 106. Consequently, mechanical flexure 308 stably biases lower contact component 316 against lower contact pad 314 in response to mechanical flexure 308 collapsing toward the infinity focus position (FIG. 3). Also, mechanical flexure 308 stably biases upper contact component 316 against upper contact pad 314 in response to mechanical flexure 308 collapsing toward the macro focus position (FIG. 4).

In some embodiments, mechanical flexure 308 may be constructed such that lens barrel 102 and lens 104 may remain stationary only in the infinity focus position (FIG. 3) or the macro focus position (FIG. 4) if not transitioning between those two positions.

In other examples, a combination of contact magnets 114 and contact pads 116 of FIGS. 1 and 2, in conjunction with mechanical flexure 308 of FIGS. 3 and 4, may be employed simultaneously to provide both magnetic and mechanical stability of lens barrel 102 and lens 104 in each of the two discrete positions along the optical axis of lens 104.

In embodiments of FIGS. 1-4, an adjustment component (not depicted in FIGS. 1-4) may be employed to finely adjust one or both of the discrete stable positions of the lens barrel 102 and lens 104. For example, a shim or an amount of adhesive (not shown in FIGS. 1-4) may be inserted between housing 106 and contact magnet 114 or contact pad 116 to tune a focus position. Other types of adjustment components or structures, such as lens 104 screwing further into or out of lens barrel 102, may be employed for fine focus adjustment in other embodiments.

Figure 5:
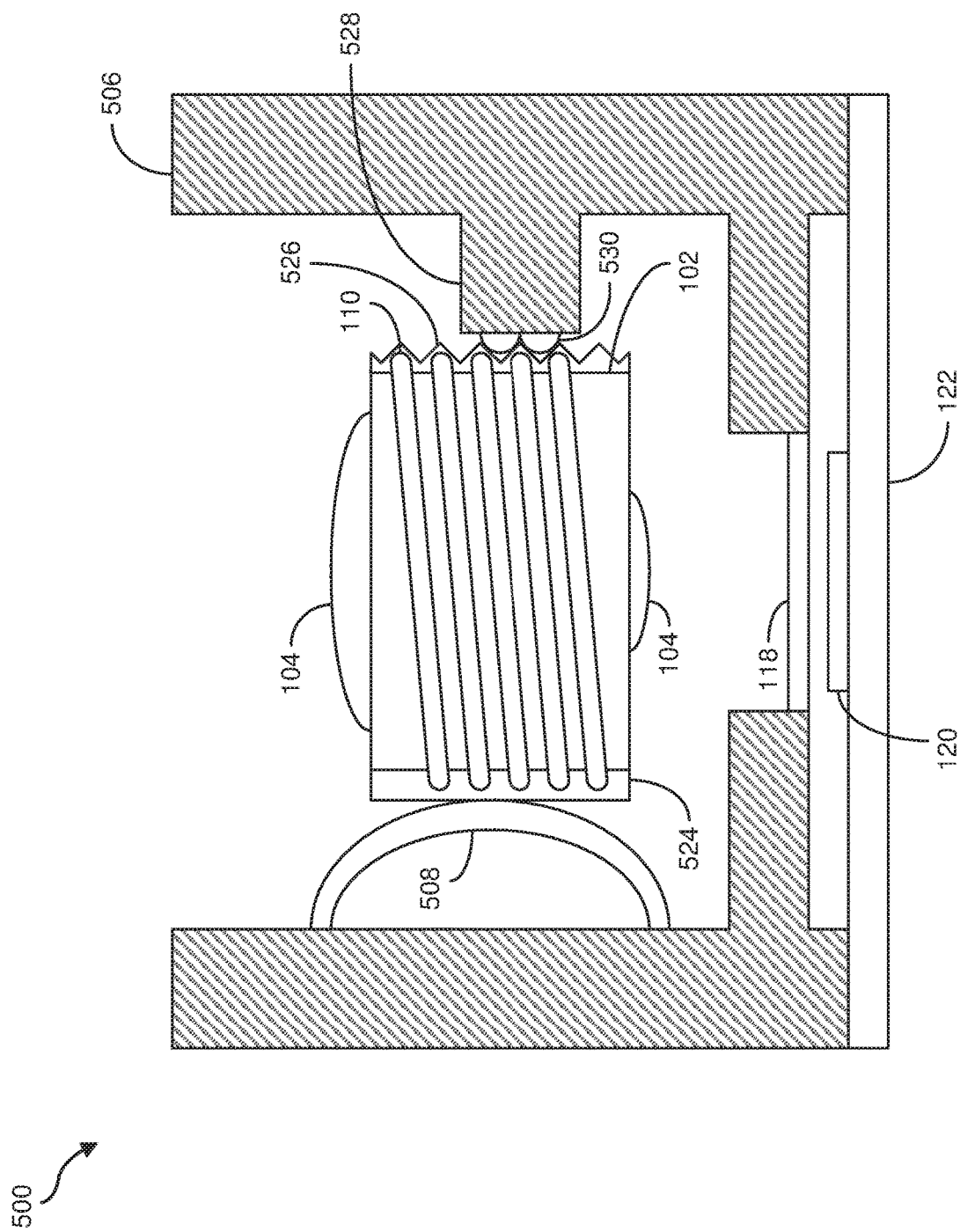
FIG. 5 is a side view of an example apparatus for a multistable lens actuator in a first intermediate focus position.
Figure 6:
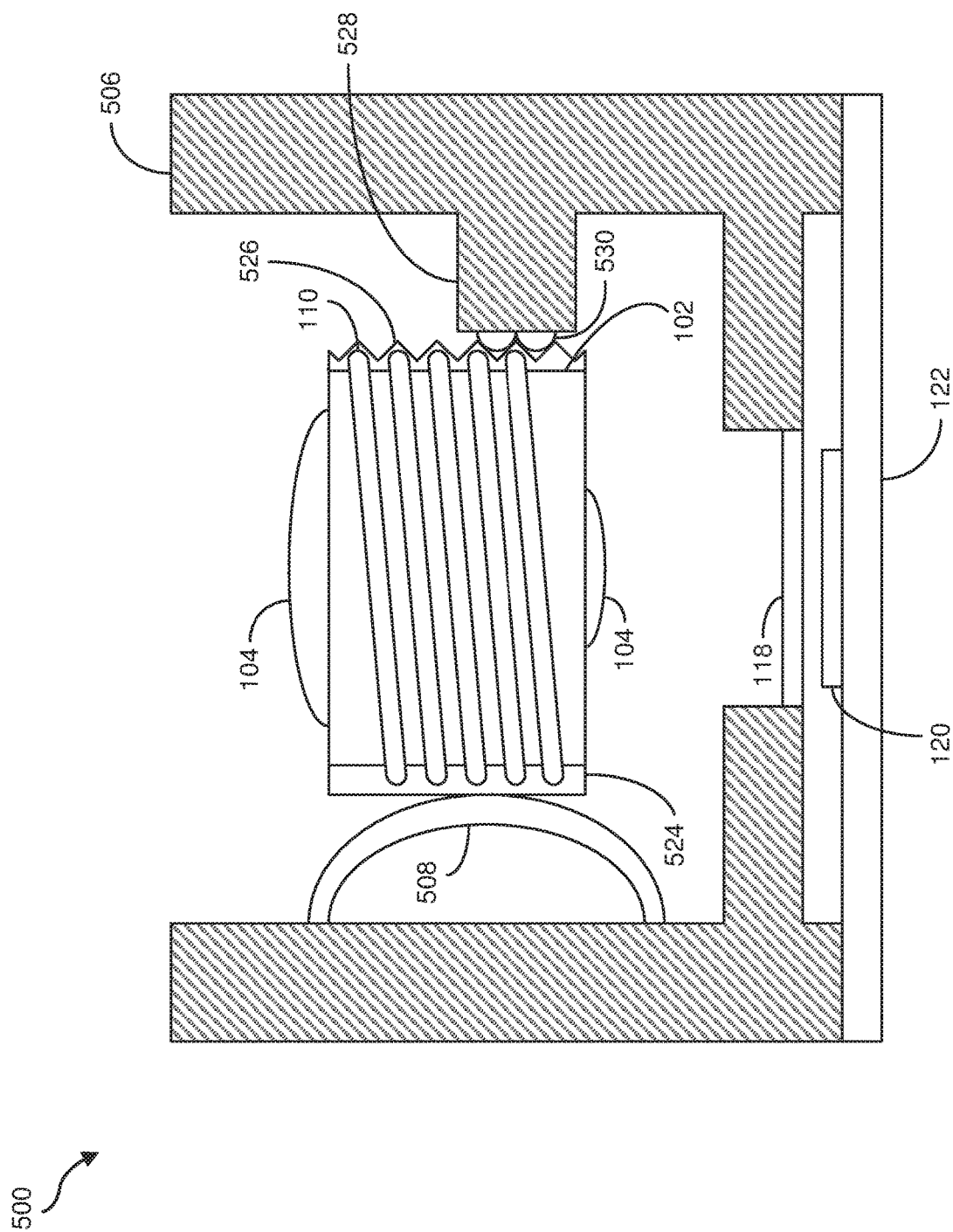
FIG. 6 is a side view of the example apparatus of FIG. 5 for a multistable lens actuator in a second intermediate focus position.

FIGS. 5 and 6 are side views of an example apparatus for a multistable lens actuator 500 in respective first and second intermediate focus positions. In these particular examples, multistable lens actuator 500 supports six discrete stable positions for lens barrel 102 and corresponding lens 104 along the optical axis of lens 104. However, in other examples, a multistable lens actuator may support two or more discrete stable positions for lens barrel 102 and lens 104.

Similar to other embodiments described above, a housing 506 is shown in cross-section, and may include plastic, metal, and/or another material of suitable rigidity. In some examples, housing 506 may be part of a larger mechanical structure, such as a body of an imaging system or a larger device. In some examples as shown above, housing 506 may also be connected to filter 118 for filtering light received through lens 104 before the light is captured at image sensor 120, which in turn may be attached to a circuit board 122 or other medium that is connected to housing 506. Consequently, housing 506, directly or indirectly, may hold filter 118 and image sensor 120 stationary relative to the movement of lens barrel 102. In some examples, electronics for capturing, processing, and storing images using lens 104, as well as electronics for facilitating movement of lens barrel 102 and for performing other functions, may reside on printed circuit board 122. In FIG. 5, housing 506 may be similar in configuration to housing 106 of FIGS. 1-4 with the exception of inward-extending portions upon which contact magnets 114 or contact pads 314 are attached, as those components are not explicitly employed in the examples of FIGS. 5 and 6.

At least one mechanical flexure 508 may maintain lens barrel 102 within a housing 106 that at least partially surrounds lens barrel 102. In some embodiments, as shown in FIGS. 5 and 6, mechanical flexure 508 may include a first end and a second end connected to an interior of housing 506, and a central portion between the first and second ends that exerts a mechanical force against an outer surface 524 of lens barrel 102, such as by way of compression. Also in some examples, mechanical flexure 108 may generally constrain the stable positioning of lens barrel 102 along the optical axis of lens 104.

Outer surface 524 of lens barrel 102, in some embodiments, may be a rigid material overlaying conductive coil 110 wound about lens barrel 102 to facilitate contact of lens barrel 102 with mechanical flexure 508 without causing undue wear to conductive coil 110. In some examples, on an opposing side of lens barrel 102, a notched or grooved surface 526 covers conductive coil 110 and lens barrel 102, with each notch or groove corresponding to a stable discrete position for lens barrel 102 and lens 104. Mating with grooved surface 526 are one or more protuberances 530 coupled to an extension 528 of an interior of housing 506 toward lens barrel 102. Other mechanical structures for defining and enforcing the discrete stable positions for lens barrel 102 and lens 104 may be employed in other embodiments.

As with other examples discussed above, in response to an electrical current (e.g., a current pulse) flowing in conductive coil 110, an electromagnetic interaction between conductive coil 110 and a magnet (not depicted in FIGS. 5 and 6) coupled to housing 506 may induce a force on conductive coil 110 and attached lens barrel 102 generally along the optical axis of lens 104, with the direction of the force determined by the direction of the electrical current flow in conductive coil 110. In some examples, the magnets may be positioned along an interior of housing 506 between protuberances 530 and mechanical flexure 508. Consequently, lens barrel 102 may compress mechanical flexure 508 as lens barrel 102 proceeds by one or more grooves of grooved surface 526 until protuberances 530 engage different grooves of grooved surface 526, resulting in mechanical flexure 508 returning to its previous less-compressed state. In some embodiments, a single current pulse may result in movement of lens barrel 102 one groove in a corresponding direction along the optical axis of lens 104. For example, a current pulse may cause lens barrel 102 to proceed from the discrete position illustrated in FIG. 5 to an adjacent discrete position (e.g., toward a macro focus position) depicted in FIG. 6. In other embodiments, lens barrel 102 may proceed multiple grooves in response to an electrical current flowing in conductive coil 110.

As with various embodiments described above, the stabilization of lens barrel 102 and lens 104 in a current discrete position may be maintained without any additional electrical current flowing in conductive coil 110. In some examples of FIGS. 5 and 6, this stabilization is provided by the force exerted by mechanical flexure 508 on lens barrel 102 via outer surface 524, thereby stably engaging grooved surface 526 against protuberances 530. Mechanical structures other than grooved surface 526, protuberances 530, and extension 528 may be employed to similar effect in other examples.

A gross position sensor may be employed in the examples of FIGS. 1-6 to provide some indication of the current discrete position at which lens 104 is located. Example types of such sensors may include, but are not limited to, Hall effect sensors, giant magnetoresistance (GMR) sensors, anisotropic magnetoresistance (AMR) sensors, other magnetic sensors, optical reflectance sensors, optical encoders, and so on.

Any one or more of the following example methods described in conjunction with FIGS. 7-10 for operation and/or calibration of a multistable lens actuator may be computer-implemented methods. Consequently, one or more of the steps shown in FIGS. 7-10 may be performed by any suitable computer-executable code and/or computing system. In one example, one or more of the steps shown in FIGS. 7-10 may represent an algorithm whose structure includes and/or is represented by multiple sub-steps, examples of which will be provided in greater detail below.

Figure 7:
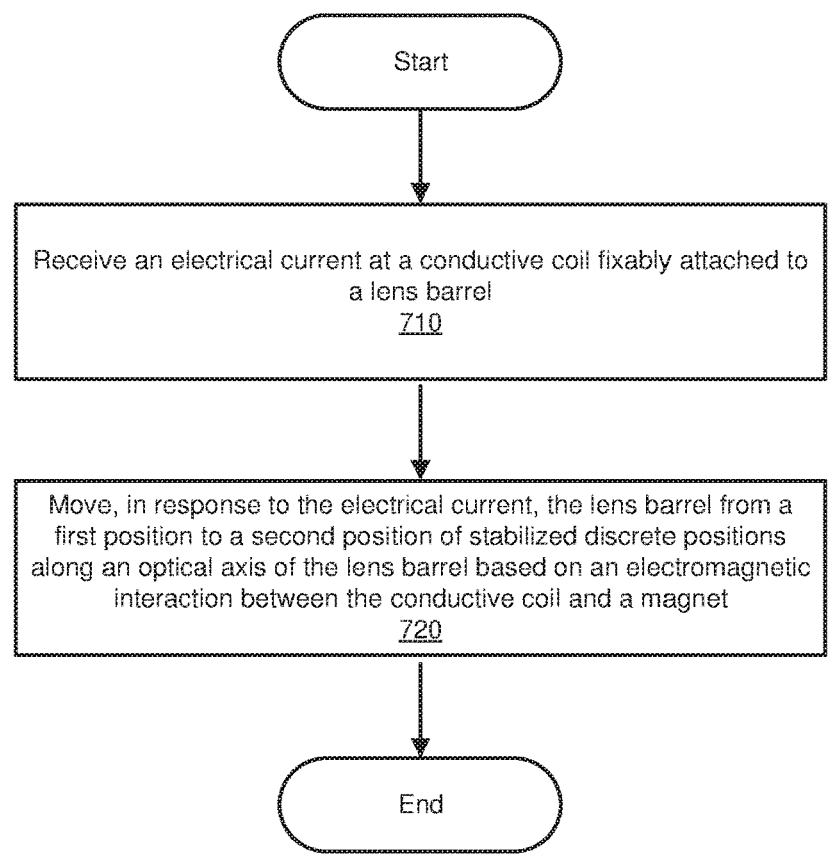
FIG. 7 is a flow diagram of an example method of operating a multistable lens actuator.

FIG. 7 is a flow diagram of an example method 700 of operating a multistable lens actuators, such as lens actuators 100, 300, and 500 of FIGS. 1-6. At step 710, an electrical current (e.g., a current pulse) may be received at a conductive coil (e.g., conductive coil 110) fixably attached to a lens barrel (e.g., lens barrel 102) containing one or more lenses (e.g., lens 104). At step 720, in response to the electrical current, the lens barrel may move from a first position to a second position of discrete positions along an optical axis of the lens barrel based on an electromagnetic interaction between the conductive coil and a magnet (e.g., magnet 112). As discussed above, in some examples, the lens barrel may be stably maintained (e.g., magnetically or mechanically) in its current position without addition electrical current flowing in the conductive coil.

In some embodiments, calibration of an imaging system employing a multistable lens actuator may be useful in increasing the accuracy of images captured by the imaging system. In some examples, system calibration may be performed by a technician or other person in a product manufacturing or testing environment associated with the manufacturer of the imaging system prior to distribution and sale of the imaging system, or of a product including the imaging system.

Figure 8:
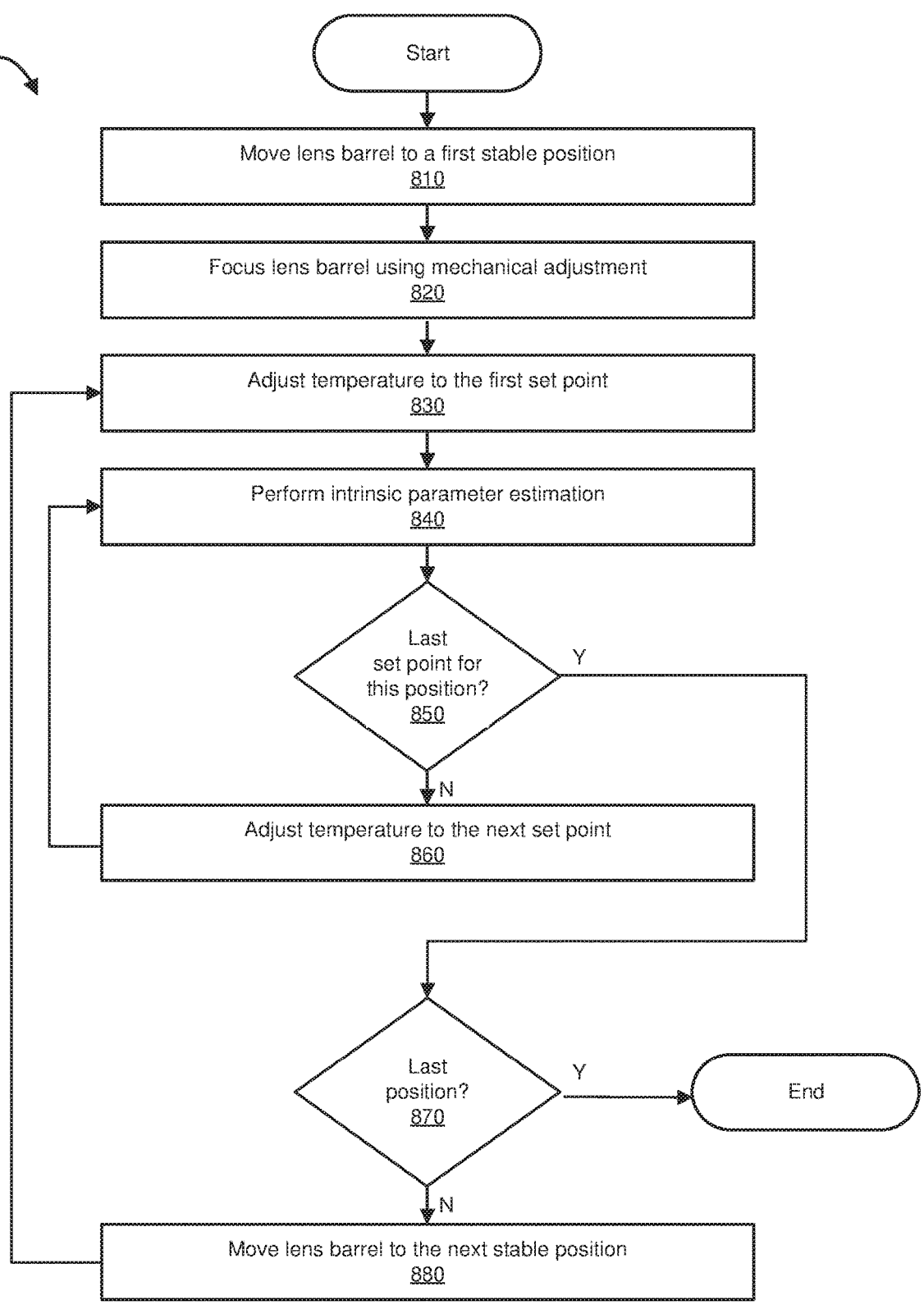
FIG. 8 is a flow diagram of an example method of calibrating an imaging system employing a multistable lens actuator.

FIG. 8 is a flow diagram of an example method 800 of calibrating an imaging system employing a multistable lens actuator (e.g., multistable lens actuators 100, 300, and 500 of FIGS. 1-6). At step 810, a lens barrel (e.g., lens barrel 102) may be moved to a first stable position, as described above. In some examples, the first stable position may be a macro focus position or an infinity focus position. At step 820, the lens barrel may be focused using a mechanical adjustment, such as a shim, adhesive, or lens screw arrangement, as discussed above.

At step 830, the temperature of the imaging system may be adjusted to a first set point of a range of temperature set points. At step 840, estimation of intrinsic parameters of the imaging system (e.g., focal length, optical center, lens distortion, and so on) may be estimated for the current temperature set point. At step 850, if the current temperature set point is not the last to be used for the current stable lens position, the temperature of the imaging system is adjusted to the next set point (step 860), and the intrinsic parameters of the imaging system are estimated again (step 840). Instead, if the current temperature set point is the last for the current lens position (step 850), then at step 870, a determination is made as to whether the current lens position is the last position to be calibrated. If not, at step 880, the lens is moved (e.g., as described in the various embodiments above) to the next stable lens position, and the intrinsic parameters of the imaging system are estimated again (step 840). Otherwise, if the current lens position is the last lens position (step 870), calibration method 800 may end.

Figure 9:
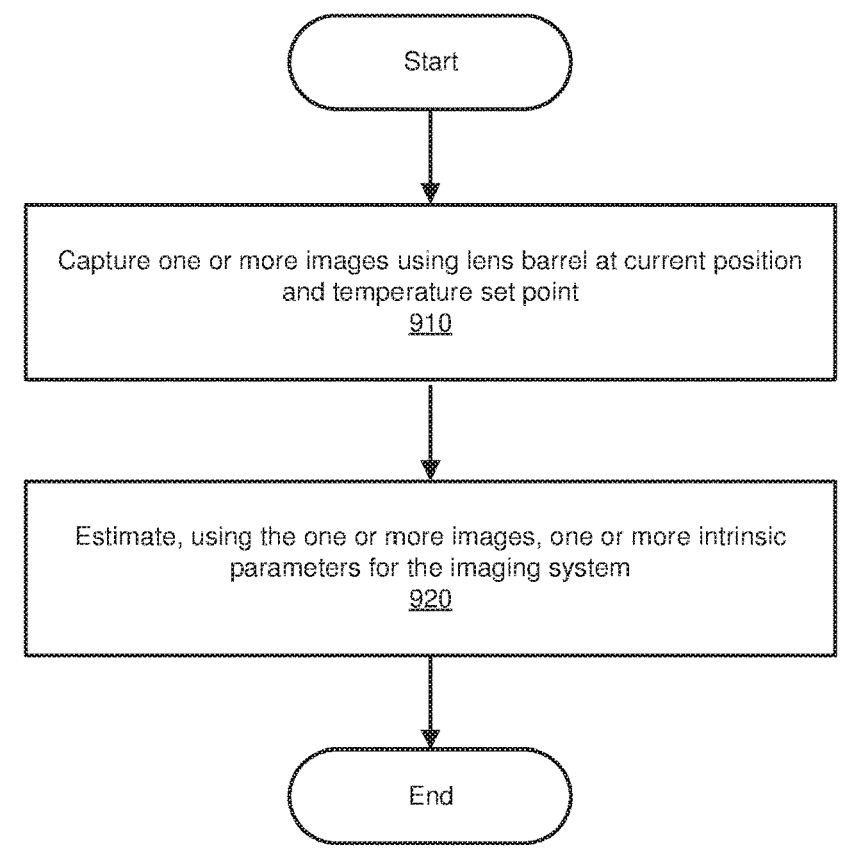
FIG. 9 is a flow diagram of an example sub-method of the method of FIG. 8 of calibrating an imaging system.

FIG. 9 is a flow diagram of an example sub-method 900 (e.g, serving as step 840 of method 800) of calibrating an imaging system, more specifically for estimating intrinsic parameters of the imaging system. At step 910, one or more images may be captured (e.g., using lens 104 and image sensor 120) using the lens barrel (e.g., lens barrel 102) at the current lens position and temperature set point. In some examples, the images may be test images, such as images with vertical and/or horizontal lines or bars, to determine proper focus, distortion, and so on. At step 920, using the one or more images, one or more intrinsic parameters for the imaging system may be estimated. In some examples, the intrinsic parameters may be stored as one or more data structure (e.g., matrices) in a data memory for use during actual operation of the imaging system.

Figure 10:
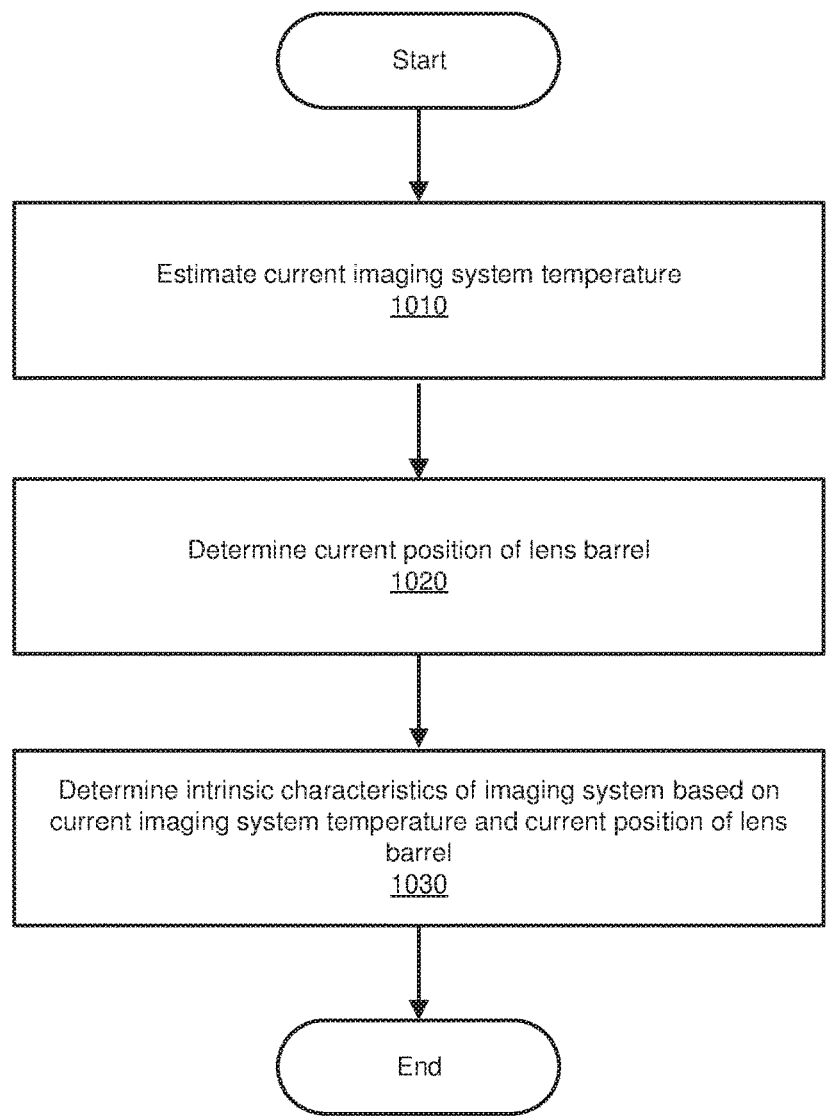
FIG. 10 is a flow diagram of an example method of operating an imaging system employing a multistable lens actuator.

FIG. 10 is a flow diagram of an example method 1000 of operating an imaging system employing a multistable lens actuator, such as multistable lens actuators 100, 300, and 500 of FIGS. 1-6. In some embodiments, method 1000 may occur during normal operation of the imaging system or a device including the imaging system at some point after calibrating the system (e.g., employing methods 800 and 900 of FIGS. 8 and 9). At step 1010, a current temperature of the imaging system is estimated, such as by way of a thermal sensor incorporated within a device employing the imaging system. At step 1020, the current position of the lens barrel (e.g., lens barrel 102) along the optical axis is determined. In some examples, an optical encoder, magnetic sensor, or other position sensor capable of determining at which of the discrete stabilized positions the lens barrel and associated lens (e.g., lens 104) are located may be used to determine the current position.

At step 1030, current intrinsic characteristics of the imaging system may be determined based on the current imaging system temperature and the current position of the lens barrel. In an example, the current temperature of the imaging system may be between two temperature set points associated with corresponding sets of intrinsic parameters generated for the current lens barrel position during a previous calibration operation. Consequently, some interpolating of the intrinsic parameters at the two set points may be performed to determine the current intrinsic characteristics of the imaging system at the current temperature for the current lens barrel position. The current intrinsic characteristics may then be applied to the image data captured at the image sensor (e.g., image sensor 120) to generate a corrected image.

Figure 11:
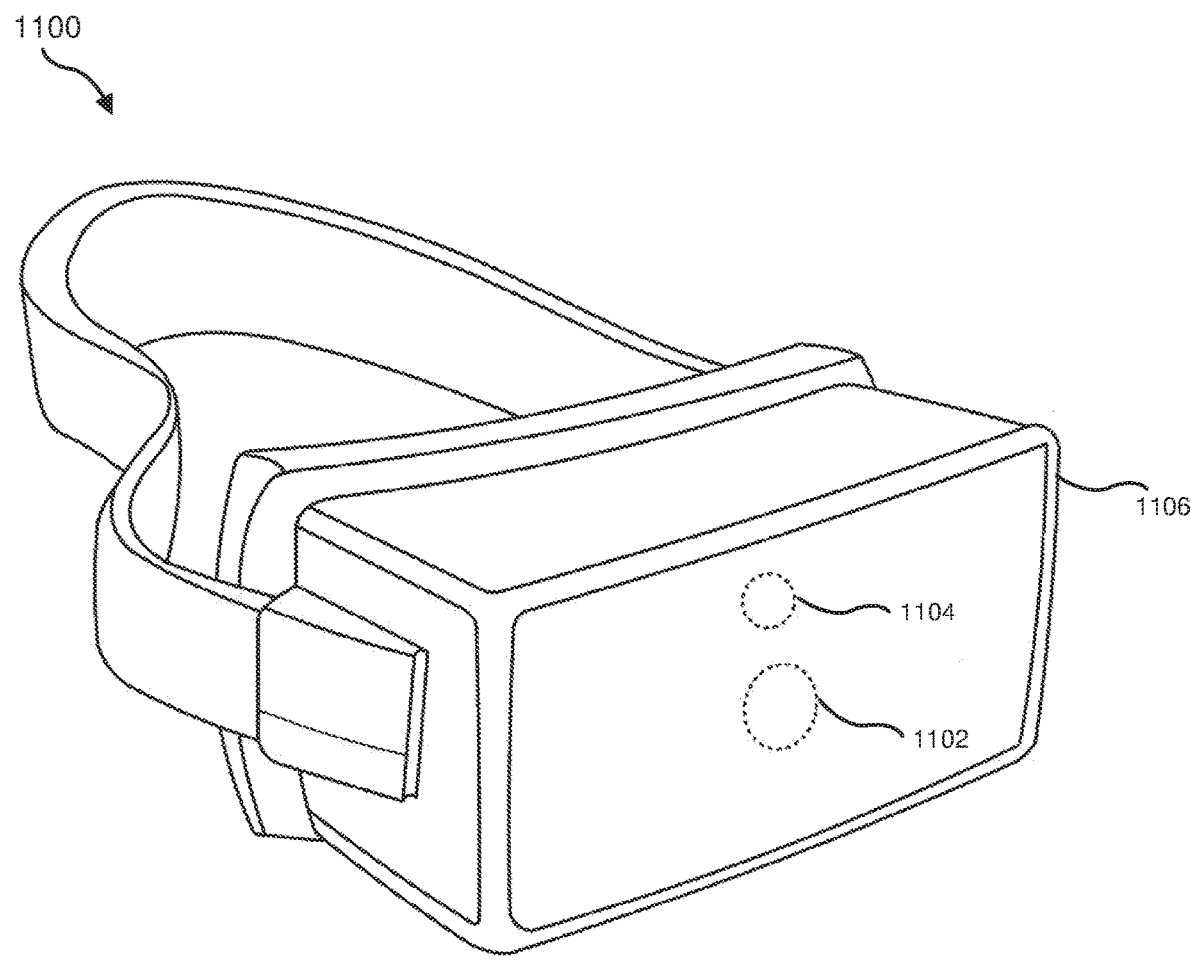
FIG. 11 is a perspective view of an example head-mounted display that may include the multistable lens actuators of FIGS. 1-6.
Figure 12:
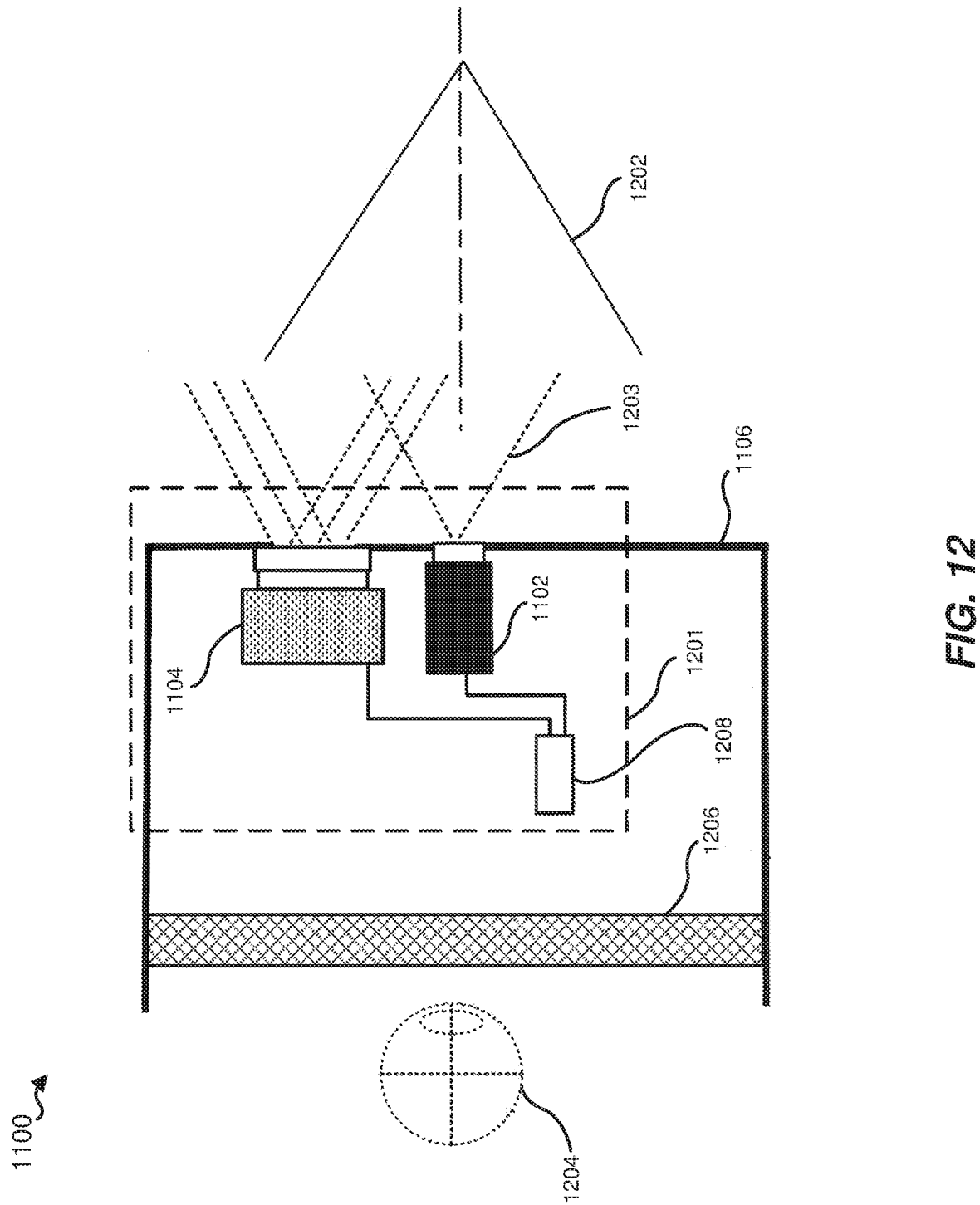
FIG. 12 is a cross-section of the example head-mounted display of FIG. 11.

FIG. 11 is a perspective view of an example head-mounted display 1100 that may include a multistable lens actuator. In an example, an imaging device 1102 or system that incorporates a multistable lens actuator (e.g., multistable lens actuator 100, 300, or 500) may be included within head-mounted display 1100. As shown in FIG. 11, head-mounted display 1100 may include a front rigid body 1106 through which an aperture (included within imaging device 1102) may receive light. In some such examples, imaging device 1102 may operate within a local area imaging assembly, which may be included within head-mounted display 1100, as illustrated in FIG. 12. In these examples, as will be discussed in greater detail in connection with FIG. 12, the local area imaging assembly may include an illumination source 1104 which may emit light through front rigid body 1106 of head-mounted display 1100.

FIG. 12 represents a cross section of front rigid body 1106 of head-mounted display 1100. As shown in FIG. 12, head-mounted display 1100 may include a local area imaging assembly 1201. In some examples, local area imaging assembly 1201 may be a device assembly configured to capture image data by way of received light 1203 that is utilized in determining, mapping, and/or tracking position, orientation, and/or movement of objects within an area, such as local area 1202 (e.g., an area surrounding head-mounted display 1100). In some examples, local area imaging assembly 1201 may include (1) imaging device 1102 and (2) illumination source 1104 configured to emit light (i.e., a carrier signal) into local area 1202.

In some embodiments, local area imaging assembly 1201 may determine depth and/or surface information for objects within local area 1202 in a variety of ways. For example, local area imaging assembly 1201 may be utilized in a simultaneous localization and mapping (SLAM) tracking system to identify and/or map features of local area 1202 and/or to identify a location, orientation, and/or movement of head-mounted display 1100 and/or other objects (e.g., hand-held controllers, users, etc.) in local area 1202. In some examples, illumination source 1104 may emit a structured light pattern (e.g., a symmetric and/or quasi-random dot pattern, a grid pattern, horizontal bars, etc.) into local area 1202. In these examples, local area imaging assembly 1201 may determine the depth and/or surface information based on triangulation or perceived deformation of the emitted pattern. In one embodiment, local area imaging assembly 1201 may capture time-of-flight (TOF) information describing the time required for light emitted from illumination source 1104 to be reflected from one or more objects in local area 1202 back to imaging device 1102. In this embodiment, local area imaging assembly 1201 may determine a distance between local area imaging assembly 1201 and the objects based on the TOF information.

In some examples, information collected by local area imaging assembly 1201 may be used as part of an image and/or video (e.g., an artificial reality image and/or video) displayed to a user wearing head-mounted display 1100. In one example, shown in FIG. 12, the image and/or video may be displayed to a user (e.g., via an eye 1204 of the user) via an electronic display 1206. Electronic display 1206 may represent a single electronic display or multiple electronic displays (e.g., a display for each eye of a user). Examples of electronic display 1206 may include, without limitation, a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a projector, a cathode ray tube, an optical mixer, and/or some combination thereof. The local area imaging assembly 1201 may also include an imaging controller 1208 that is coupled to illumination source 1104 and/or imaging device 1102.

In at least one embodiment, a head-mounted display system including head-mounted display 1100 may additionally or alternatively include controller tracking features (e.g., constellation tracking). For example, in addition to determining features of local area 1202, local area imaging assembly 1201 may track a position, orientation, and/or movement of one or more controller devices, such as hand-held controllers, that are utilized by a user for interacting with head-mounted display 1100 and/or local area 1202.

Figure 13:
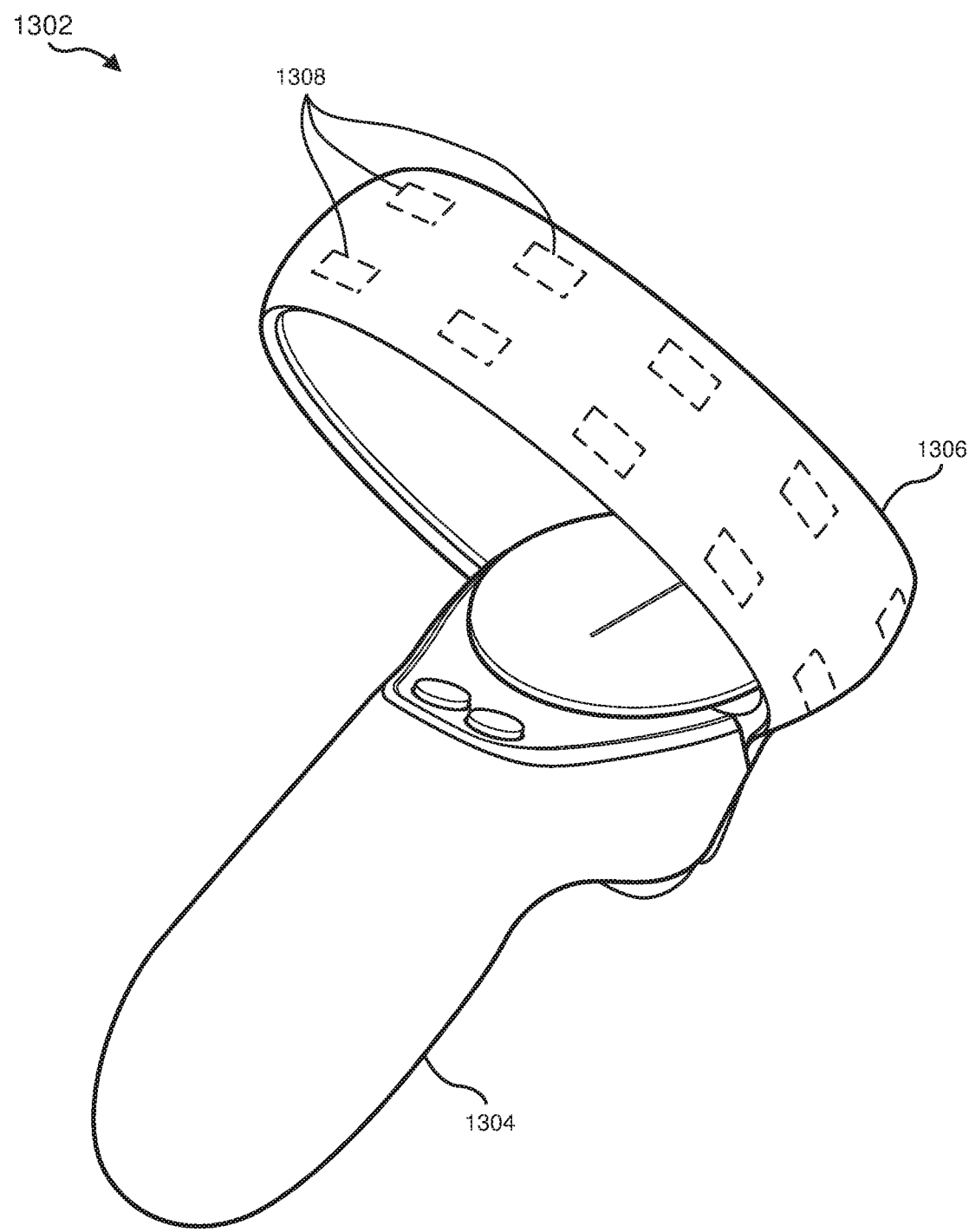
FIG. 13 is a perspective view of an example hand-held controller employable with the example head-mounted display of FIGS. 11 and 12.

FIG. 13 is a perspective view of an example hand-held controller 1302 that may be included in the head-mounted display system that includes head-mounted display 1100 in accordance with some embodiments. The head-mounted-display system may include at least one hand-held controller 1302. For example, the head-mounted-display system may include two hand-held controllers 1302, with one hand-held controller 1302 for each of a user's right and left hands. Each hand-held controller 1302 may be communicatively coupled to head-mounted display 1100 shown in FIGS. 11 and 12 and/or to a computing device (e.g., a personal computer, a console, etc.) communicatively coupled to head-mounted display 1100. Hand-held controller 1302 may be communicatively coupled to head-mounted display 1100 via any suitable wireless and/or wired connection.

As shown in FIG. 13, hand-held controller 1302 may include a grip 1304 sized to fit within a user's right or left hand. Hand-held controller 1302 may also include a tracking loop 1306 for tracking position, orientation, and/or movement of hand-held controller 1302 with respect to head-mounted display 1100 and/or with respect to local area 1202. For example, tracking loop 1306 may include an array of tracking lights 1308, such as tracking LEDs (e.g., infrared (IR) LEDs), that are used for motion and positional tracking purposes to provide 360-degree motion control while using the head-mounted display system. Controller 1302 may additionally or alternatively include tracking lights, such as tracking LEDs, on any other suitable portion of controller 1302. In at least one embodiment, imaging device 1102 may receive light emitted by tracking lights 1308 on hand-held controller 1302, such as tracking LEDs on tracking loop 1306, and local area imaging assembly 1201 may utilize the received light to determine location, orientation, and/or movement of hand-held controller 1302.

According to some embodiments, local area imaging assembly 1201 shown in FIG. 12 may be utilized as part of a hybrid system for (1) SLAM imaging to locate, map, and/or track features of local area 1202 (e.g., using depth and/or surface information) and (2) controller tracking to determine location, orientation, and/or movement of one or more hand-held controllers 1302 used by a user of the head-mounted display system. In one example, local area imaging assembly 1201 may utilize light in a mostly visible band for SLAM imaging of local area 1202. For example, illumination source 1104 of local area imaging assembly 1201 may emit light having wavelengths between approximately 400 nm to approximately 700 nm into local area 1202. Imaging device 1102 may receive and utilize light emitted by illumination source 1104 (i.e., light wavelengths between approximately 400 nm to approximately 700 nm) for SLAM tracking and/or mapping of local area 1202.

Additionally, local area imaging assembly 1201 may track at least one object in local area 1202 using light in a different wavelength range than light utilized in SLAM imaging as described above. For example, local area imaging assembly 1201 may receive and utilize light in an IR band (e.g., near-infrared (NIR) light) for IR tracking of at least one hand-held controller 1302 (see FIG. 13). In one example, hand-held controller 1302 may emit light having wavelengths greater than approximately 700 nm via, for example, an array of IR LEDs (e.g., tracking lights 1308 on tracking loop 1306). For example, tracking lights 1308 of hand-held controller 1302 may emit light having wavelengths between approximately 710 nm to approximately 900 nm. In one embodiment, tracking lights 1308 of hand-held controller 1302 may emit light having a wavelength of approximately 850 nm (e.g., between approximately 840 nm to approximately 860 nm). Imaging device 1102 may receive and utilize IR light emitted by hand-held controller 1302 for tracking location, orientation, and/or movement of hand-held controller 1302 relative to head-mounted display 1100 and/or local area 1202. Any other suitable ranges of light may be respectively utilized for SLAM imaging and controller tracking, where distinct ranges are utilized for each of the SLAM imaging and controller tracking purposes. In at least one embodiment, separate frames (e.g., alternating frames) captured by imaging device 1102 may be respectively utilized by local area imaging assembly 1201 for SLAM imaging and controller tracking as described herein. For example, one or more frames captured by imaging device 1102 during a time period may be utilized for SLAM imaging and one or more frames captured by imaging device 1102 during a subsequent time period may be utilized for controller tracking.

In some examples, a local area imaging assembly (e.g., local area imaging assembly 1201) with one or more of the features described above may be disposed within an external sensor device for tracking and/or mapping features of local area 1202, portions of the head-mounted display system (e.g., head-mounted display 1100, hand-held controllers 1302, etc.), and/or one or more users and/or objects within local area 1202. In some examples, the external sensor device is a device that is used to detect the position, orientation, and/or motion of an additional device and/or object in a local area of the external sensor device. In one example, the local area imaging assembly 1201 may be utilized in an external sensor device that is separate from head-mounted display 1100, such as an external sensor bar and/or other suitable external sensor device.

In some examples, the instant disclosure may include a system, such as an artificial reality system, including a local area imaging assembly (e.g., local area imaging assembly 1201), which may include an imaging device (e.g., imaging device 1102), with at least one of the features discussed above. Also, in some embodiments, the instant disclosure may include a method for manufacturing, assembling, using, and/or otherwise configuring or creating a system with one or more of the features described herein.

As discussed throughout the instant disclosure, the disclosed apparatuses, systems, and methods may provide a multistable lens actuator that positions a lens (and or associated lens barrel) at any of two or more stable discrete positions along an optical axis of the lens, as opposed to anywhere within a continuous range of locations. Consequently, control circuitry for setting a desired location may be simplified, and sensor circuitry for determining a current location of the lens among the limited number of discrete locations may be correspondingly less complex. Moreover, less interpolation of intrinsic parameters for an associated imaging system may be required, as interpolation with respect to lens position may be unnecessary due to the ease with which calibration may be performed at each of the limited number of lens positions that are possible with a multistable lens actuator. In addition, due to the magnetic and/or mechanical stability provided in the various examples of a multistable lens actuator described herein, resistance to mechanical shocks of a device incorporating such an actuator may be enhanced.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

The terminology used in the description of the various described embodiments here is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. An apparatus comprising:
   a camera lens assembly comprising at least one lens held within a lens barrel;
   a conductive coil fixably attached to the lens barrel;
   a housing at least partially surrounding the conductive coil and the lens barrel;
   at least one mechanical flexure maintaining the lens barrel within the housing and allowing movement of the lens barrel between stabilized discrete positions along an optical axis of the lens barrel; and
   a magnet spaced from the conductive coil and coupled to the housing such that, in response to an electrical current in the conductive coil, an electromagnetic interaction between the conductive coil and the magnet causes the lens barrel to move from a first position of the stabilized discrete positions to a second position of the stabilized discrete positions, wherein the lens barrel stably remains at a present position of the stabilized discrete positions when the electrical current ceases.

2. The apparatus of claim 1, wherein the conductive coil surrounds the lens barrel.

3. The apparatus of claim 1, further comprising:
   an adjustment component that determines the first position.

4. The apparatus of claim 1, wherein the first position corresponds to an infinity focus position for the lens barrel and the second position corresponds to a macro focus position for the lens barrel.

5. The apparatus of claim 1, wherein a maximum number of the stabilized discrete positions is two.

6. The apparatus of claim 5, further comprising:
   a first contact component connected to the housing, wherein the first contact component defines the first position when the lens barrel contacts the first contact component; and
   a second contact component connected to the housing, wherein the second contact component defines the second position when the lens barrel contacts the second contact component.

7. The apparatus of claim 6, wherein the at least one mechanical flexure biases the lens barrel against the first contact component at the first position to mechanically stabilize the lens barrel at the first position and biases the lens barrel against the second contact component at the second position to mechanically stabilize the lens barrel at the second position.

8. The apparatus of claim 6, wherein:
   the first contact component comprises a first contact magnet that magnetically stabilizes the lens barrel at the first position; and
   the second contact component comprises a second contact magnet that magnetically stabilizes the lens barrel at the second position.

9. The apparatus of claim 8, further comprising:
   a first metallic extension coupled to the lens barrel that contacts the first contact magnet when the lens barrel is at the first position; and
   a second metallic extension coupled to the lens barrel that contacts the second contact magnet when the lens barrel is at the second position.

10. The apparatus of claim 5, wherein the at least one mechanical flexure comprises:
    a first mechanical flexure coupled to the lens barrel proximate a first end of the lens barrel; and
    a second mechanical flexure coupled to the lens barrel proximate a second end of the lens barrel opposite the first end.

11. The apparatus of claim 1, wherein a maximum number of the stabilized discrete positions is greater than two.

12. The apparatus of claim 11, wherein:
    the housing defines an inner surface facing the lens barrel;
    the lens barrel defines an outer surface facing the housing that stably engages the inner surface of the housing at each of the stabilized discrete positions; and
    the at least one mechanical flexure biases the outer surface of the lens barrel against the inner surface of the housing.

13. The apparatus of claim 12, wherein:
    the inner surface of the housing comprises at least one protrusion; and
    the outer surface of the lens barrel comprises a plurality of grooves that stably engage the at least one protrusion at each of the stabilized discrete positions.

14. The apparatus of claim 12, wherein each of the at least one mechanical flexure comprises:
    a first end and a second end connected to the housing; and
    a central portion between the first end and the second end that exerts a mechanical force against the outer surface of the lens barrel.

15. The apparatus of claim 1, further comprising:
    at least one position sensor that indicates a current position of the stabilized discrete positions of the lens barrel.

16. A system comprising:
    a camera lens assembly comprising at least one lens held within a lens barrel;
    a conductive coil fixably attached to the lens barrel;
    a housing at least partially surrounding the conductive coil and the lens barrel;
    at least one mechanical flexure maintaining the lens barrel within the housing while allowing movement of the lens barrel between stabilized discrete positions along an optical axis of the lens barrel;
    a magnet spaced from the conductive coil and coupled to the housing such that, in response to an electrical current in the conductive coil, an electromagnetic interaction between the conductive coil and the magnet causes the lens barrel to move from a first position of the stabilized discrete positions to a second position of the stabilized discrete positions, wherein the lens barrel stably remains at a present position of the stabilized discrete positions when the electrical current ceases; and an image sensor mechanically coupled to the housing and optically coupled to the at least one lens to capture light passing through the at least one lens.

17. A method comprising:

receiving, at a conductive coil fixably attached to a lens barrel, an electrical current, wherein the lens barrel is maintained within a housing by at least one mechanical flexure; and moving, in response to the electrical current, the lens barrel from a first position of a plurality of stabilized discrete positions to a second position of the plurality of stabilized discrete positions along an optical axis of the lens barrel based on an electromagnetic interaction between the conductive coil and a magnet spaced from the conductive coil and coupled to the housing, wherein the lens barrel stably remains at a present position of the plurality of stabilized discrete positions when the electrical current ceases.

18. The method of claim 17, wherein the plurality of stabilized discrete positions comprises an infinity focus position for the lens barrel and a macro focus position for the lens barrel.

* * * * *